United States Patent
Nakahara et al.

(10) Patent No.: US 11,872,493 B2
(45) Date of Patent: Jan. 16, 2024

(54) INFORMATION PROCESSING PROGRAM, INFORMATION PROCESSING SERVER, INFORMATION PROCESSING METHOD, AND INFORMATION PROCESSING SYSTEM

(71) Applicant: CYGAMES, INC., Tokyo (JP)

(72) Inventors: Keisuke Nakahara, Tokyo (JP); Takuya Okazawa, Tokyo (JP)

(73) Assignee: CYGAMES, INC., Tokyo (JP)

( * ) Notice: Subject to any disclaimer, the term of this patent is extended or adjusted under 35 U.S.C. 154(b) by 151 days.

(21) Appl. No.: 17/083,987

(22) Filed: Oct. 29, 2020

(65) Prior Publication Data

US 2021/0038993 A1 Feb. 11, 2021

Related U.S. Application Data

(63) Continuation of application No. PCT/JP2019/017241, filed on Apr. 23, 2019.

(30) Foreign Application Priority Data

May 1, 2018 (JP) ................................ 2018-088162

(51) Int. Cl.
*A63F 13/00* (2014.01)
*A63F 13/69* (2014.01)
(Continued)

(52) U.S. Cl.
CPC ............ *A63F 13/69* (2014.09); *A63F 13/533* (2014.09); *A63F 13/537* (2014.09); *A63F 13/58* (2014.09)

(58) Field of Classification Search
CPC ......... G06T 17/05; G06T 17/00; A63F 13/52; A63F 13/00; A63F 13/79; A63F 13/822; A63F 13/69; A63F 13/55
See application file for complete search history.

(56) References Cited

U.S. PATENT DOCUMENTS 8,986,115 B2 * 3/2015 Vignocchi ............... A63F 13/69
463/43
9,352,217 B1 * 5/2016 Curtis .................... A63F 13/67
(Continued)

FOREIGN PATENT DOCUMENTS

JP 2003038852 A 2/2003
JP 2013-153815 A 8/2013
(Continued)

OTHER PUBLICATIONS

Office Action issued in the counterpart Japanese Patent Application No. 2018-233043, dated Jun. 2, 2022 (8 pages).
(Continued)

*Primary Examiner* — David L Lewis
*Assistant Examiner* — Eric M Thomas
(74) *Attorney, Agent, or Firm* — Osha Bergman Watanabe & Burton LLP

(57) ABSTRACT

An information processing program causes a computer to realize: an obtaining unit that obtains item possession information indicating whether or not a player possesses a first item, which can be obtained by executing predetermined processing in a game, first item information indicating the first item managed in association with the processing, and executable processing information indicating the processing that can be executed by the player; and an output-information generating unit (319) that generates output information for reporting that the first item can be obtained in a display screen displaying information concerning the first item not possessed by the player in the case where it is determined, on the basis of the item possession information, that the player does not possess the first item and it is determined, on the basis of the first item information and the executable processing information, that the player can execute processing by which the first item can be obtained.

11 Claims, 11 Drawing Sheets

(51) Int. Cl.
    *A63F 13/533*    (2014.01)
    *A63F 13/537*    (2014.01)
    *A63F 13/58*    (2014.01)

(56) References Cited

U.S. PATENT DOCUMENTS

| | | | |
|---|---|---|---|
| 9,457,263 B2 * | 10/2016 | Vignocchi | A63F 13/95 |
| 2012/0220377 A1 * | 8/2012 | Cantor | A63F 13/795 |
| | | | 463/42 |
| 2018/0350144 A1 * | 12/2018 | Rathod | H04W 4/021 |

FOREIGN PATENT DOCUMENTS

| | | |
|---|---|---|
| JP | 2013-230381 A | 11/2013 |
| JP | 2017012424 A | 1/2017 |
| JP | 2018014413 A | 1/2018 |
| WO | 2013/046811 A1 | 4/2013 |

OTHER PUBLICATIONS

Producer's Letter for "For Whom the Alchemist Exists," Jan. 2017, URL:https://al.fg-games.co.jp/news/6523 (10 pages).
Release of "Advanced Quests for Evolution Materials"!, Feb. 2016, URL:https://al.fg-games.co.jp/news/821/ (5 pages).
Yahoo Chiebukuro, May 27, 2015, URL:https://detail.chiebukuro.yahoo.co.jp/qa/question_detail/q12169855167 (4 pages).
"Everybody's Golf 3" Dengeki Playstation; vol. 8, No. 4, p. 287; Feb. 22, 2002 (5 pages).

* cited by examiner

Fig. 4

ITEM MANAGEMENT INFORMATION

| ITEM ID | NAME | CAPABILITY | ITEMS USED FOR COMBINING | ... |
|---|---|---|---|---|
| IA | ITEM A | OFFENSIVE POWER 10 | ITEM D | ... |
| IB | ITEM B | DEFENSIVE POWER 5 | ITEM N<br>ITEM S<br>ITEM Z | ... |
| IC | ITEM C | STAMINA 20 | — | ... |
| ... | ... | ... | ... | ... |

Fig. 5

QUEST MANAGEMENT INFORMATION

| QUEST ID | NAME | STAMINA CONSUMED | AVAILABLE ITEMS | ... |
|---|---|---|---|---|
| Q1-1 | QUEST 1-1 | 10 | ITEM S | ... |
| | | | ITEM F | |
| | | | ... | |
| ... | ... | ... | ... | ... |
| Q3-3 | QUEST 3-3 | 20 | ITEM E | ... |
| | | | ITEM C | |
| | | | ... | |
| ... | ... | ... | ... | ... |
| Q5-7 | QUEST 5-7 | 30 | ITEM D | ... |
| | | | ITEM N | |
| ... | ... | ... | ... | ... |
| Q6-2 | QUEST 6-2 | 35 | ITEM C | ... |
| | | | ITEM D | |
| | | | ... | |
| ... | ... | ... | ... | ... |

Fig. 6

PLAYER MANAGEMENT INFORMATION

| PLAYER ID | NAME | PLAYER CHARACTER | OPEN QUESTS | POSSESSED ITEMS | OWNED STAMINA | OWNED CURRENCY | ... |
|---|---|---|---|---|---|---|---|
| PA | PLAYER A | C1(LEVEL15) C2(LEVEL17) ... | QUEST 1-1 ~ QUEST 6-1 | ITEM A ITEM C ... | 50 | 1000 | ... |
| PB | PLAYER B | C5(LEVEL40) C7(LEVEL45) ... | QUEST 1-1 ~ QUEST 4-5 | ITEM B ITEM D ... | 100 | 5000 | ... |
| ... | ... | ... | ... | ... | ... | ... | ... |

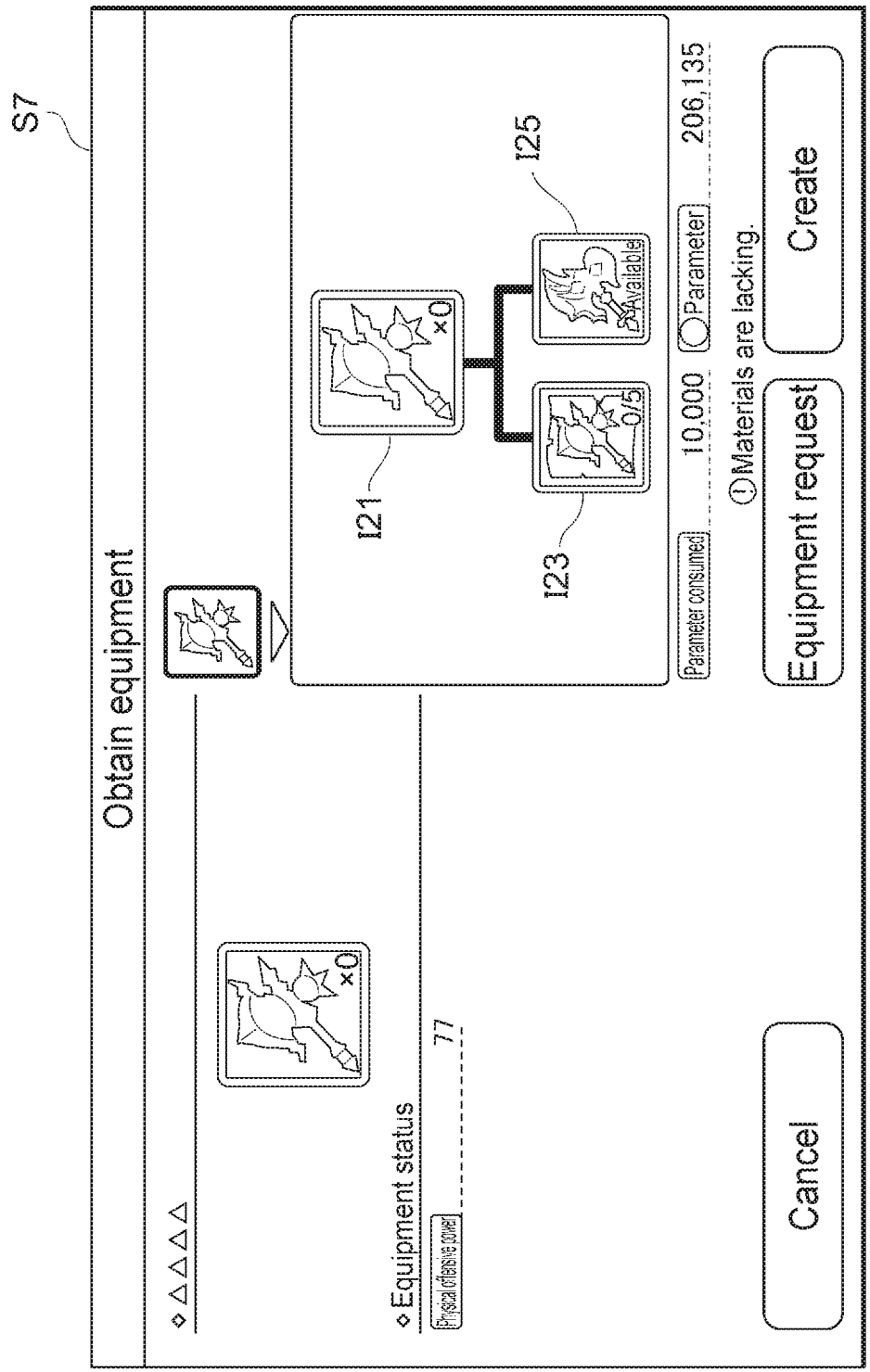

INFORMATION PROCESSING PROGRAM, INFORMATION PROCESSING SERVER, INFORMATION PROCESSING METHOD, AND INFORMATION PROCESSING SYSTEM

TECHNICAL FIELD

The present invention relates to information processing programs, information processing servers, information processing methods, and information processing systems.

BACKGROUND ART

Games in which battles are played on the basis of capability values, etc. associated with items owned by players have been known since before. In these games, there is a function for combining an item serving as a base with another item serving as a material to empower the capability value of the base item, such as the offensive power.

For example, Patent Literature 1 discloses an information processing device that determines whether or not a player of a game owns various kinds of such items and that displays, as a result of this determination, images indicating items possessed by the player and images indicating items not possessed by the player in different modes in an item management screen associated with the player.

CITATION LIST

Patent Literature

{PTL 1}
Japanese Unexamined Patent Application, Publication No. 2018-014413

SUMMARY OF INVENTION

Technical Problem

With conventional information processing devices that execute games, such as the one disclosed in Patent Literature 1, it has not been possible to readily recognize items that are not possessed by a player but that can be obtained in the future.

Accordingly, some aspects of the present invention have been made in view of the situation described above, and it is an object thereof to provide an information processing program, an information processing server, an information processing method, and an information processing system for providing a game in which it is possible to readily recognize items that can be obtained.

Solution to Problem

An information processing program according to an aspect of the present invention is an information processing program for causing a computer to realize: an obtaining unit that obtains item possession information indicating whether or not a player possesses a first item, which can be obtained by executing predetermined processing in a game, first item information indicating the first item managed in association with the processing, and executable processing information indicating the processing that can be executed by the player; and an output-information generating unit that generates output information for reporting that the first item can be obtained in a display screen displaying information concerning the first item not possessed by the player in the case where it is determined, on the basis of the item possession information, that the player does not possess the first item and it is determined, on the basis of the first item information and the executable processing information, that the player can execute processing by which the first item can be obtained.

An information processing program according to an aspect of the present invention is an information processing program for causing a computer to realize: an obtaining unit that obtains item possession information indicating whether or not a player possesses a first item and a second item, which can be obtained by executing predetermined processing in a game, first item information indicating the first item managed in association with the processing, second item information indicating a second item consumed for the purpose of acquiring the first item and managed in association with the processing, and executable processing information indicating the processing that can be executed by the player; and an output-information generating unit that generates output information for reporting that the first item can be obtained in a display screen displaying information concerning the first item not possessed by the player in the case where it is determined, on the basis of the item possession information, that the player does not possess the first item and it is determined, on the basis of the second item information and the executable processing information, that the player can execute at least a portion of processing by which the second item can be obtained.

An information processing server according to an aspect of the present invention includes: a recording unit that records item possession information indicating whether or not a player possesses a first item, which can be obtained by executing predetermined processing in a game, that records first item information indicating the first item managed in association with the processing, and that records executable processing information indicating the processing that can be executed by the player; and an output-information generating unit that generates output information for reporting that the first item can be obtained in a display screen displaying information concerning the first item not possessed by the player in the case where it is determined, on the basis of the item possession information, that the player does not possess the first item and it is determined, on the basis of the first item information and the executable processing information, that the player can execute processing by which the first item can be obtained.

An information processing server according to an aspect of the present invention includes: a recording unit that records item possession information indicating whether or not a player possesses a first item and a second item, which can be obtained by executing predetermined processing in a game, first item information indicating the first item managed in association with the processing, second item information indicating a second item consumed for the purpose of acquiring the first item and managed in association with the processing, and executable processing information indicating the processing that can be executed by the player; and an output-information generating unit that generates output information for reporting that the first item can be obtained in a display screen displaying information concerning the first item not possessed by the player in the case where it is determined, on the basis of the item possession information, that the player does not possess the first item and it is determined, on the basis of the second item information and the executable processing information, that the player can execute at least a portion of processing by which the second item can be obtained.

An information processing method according to an aspect of the present invention includes: a step of recording item possession information indicating whether or not a player possesses a first item, which can be obtained by executing predetermined processing in a game; a step of recording first item information indicating the first item managed in association with the processing; a step of recording executable processing information indicating the processing that can be executed by the player; and a step of generating output information for reporting that the first item can be obtained in a display screen displaying information concerning the first item not possessed by the player in the case where it is determined, on the basis of the item possession information, that the player does not possess the first item and it is determined, on the basis of the first item information and the executable processing information, that the player can execute processing by which the first item can be obtained.

An information processing method according to an aspect of the present invention includes: a step of recording item possession information indicating whether or not a player possesses a first item and a second item, which can be obtained by executing predetermined processing in a game; a step of recording first item information indicating the first item managed in association with the processing; a step of recording second item information indicating a second item consumed for the purpose of acquiring the first item and managed in association with the processing; a step of recording executable processing information indicating the processing that can be executed by the player; and a step of generating output information for reporting that the first item can be obtained in a display screen displaying information concerning the first item not possessed by the player in the case where it is determined, on the basis of the item possession information, that the player does not possess the first item and it is determined, on the basis of the second item information and the executable processing information, that the player can execute at least a portion of processing by which the second item can be obtained.

An information processing system according to an aspect of the present invention is an information processing system including: an information processing server; and a terminal communicatively connected to the information processing server, wherein the information processing server includes: a recording unit that records item possession information indicating whether or not a player possesses a first item, which can be obtained by executing predetermined processing in a game, that records first item information indicating the first item managed in association with the processing, and that records executable processing information indicating the processing that can be executed by the player; and a sending unit that sends the item possession information, the first item information, and the executable processing information, and wherein the terminal includes: an obtaining unit that obtains the item possession information, the first item information, and the executable processing information; and an output-information generating unit that generates output information for reporting that the first item can be obtained in a display screen displaying information concerning the first item not possessed by the player in the case where it is determined, on the basis of the item possession information, that the player does not possess the first item and it is determined, on the basis of the first item information and the executable processing information, that the player can execute processing by which the first item can be obtained.

An information processing system according to an aspect of the present invention is an information processing system including: an information processing server; and a terminal communicatively connected to the information processing server, wherein the information processing server includes: a recording unit that records item possession information indicating whether or not a player possesses a first item and a second item, which can be obtained by executing predetermined processing in a game, that records first item information indicating the first item managed in association with the processing, that records second item information indicating a second item consumed for the purpose of acquiring the first item and managed in association with the processing, and that records executable processing information indicating the processing that can be executed by the player; and a sending unit that sends the item possession information, the first item information, the second item information, and the executable processing information, and wherein the terminal includes: an obtaining unit that obtains the item possession information, the first item information, the second item information, and the executable processing information; and an output-information generating unit that generates output information for reporting that the first item can be obtained in a display screen displaying information concerning the first item not possessed by the player in the case where it is determined, on the basis of the item possession information, that the player does not possess the first item and it is determined, on the basis of the second item information and the executable processing information, that the player can execute at least a portion of processing by which the second item can be obtained.

A "player" refers to a user who operates a terminal device, and is also a concept corresponding to a client in what is called a client-server system. Furthermore, generally, a "player" may participate in a game via what is called a player character (character) that is engaged in activities, take actions, and so forth in a virtual game space instead of the player himself or herself, or via a suitable game medium associated with the player character.

Examples of a "game" include a game in which a character or an item is raised, a game in which a player organizes a party by using an owned character and plays battles against enemy characters, and a rhythm game in which a player organizes a party by using an owned character to play the game. Furthermore, examples of a "game" may include various kinds of games, such as action games, quiz games, pinball games, and card games.

An "item" refers to information that is managed in association with a player in a game and that is different from a "parameter", which will be described later. For example, an "item" refers to something generating an effect that brings about an advantage in proceeding with a game in which the player participates, relative to other players or enemy characters in the game, or something that enhances a value or a sense of value when it is acquired or owned, and the kinds thereof are not particularly limited. Examples of "items" include various kinds of items for increasing the offensive power, the defensive power, etc. of the player. However, without limitation to those items, examples of "items" may include various kinds of items for increasing damage to other players and enemy characters in the game, various kinds of items for recovering the stamina of the player, etc.

"Items" include "equipment items" and "material items". An "equipment item" refers to an item that a character can be equipped with; for example, an "equipment item" can increase the offensive power or the like of a character when the character is equipped therewith. A "material item" refers to an item that is consumed for the purpose of acquiring an "equipment item". For example, an equipment item may be acquired by combining two or more of the same or the same kind of material item, or an equipment item may be acquired by combining two or more different material items. Alternatively, an "equipment item" may be acquired by exchanging a plurality of "material items" therefor. A "material item" is not limited to an item for acquiring an "equipment item" and may be an item for acquiring another "material item".

"Predetermined processing in a game" may include predetermined processing by which an item can be directly obtained in the game. For example, predetermined processing by which an item can be obtained includes a "quest", which will be described later. Furthermore, predetermined processing by which an item can be obtained may include "gacha", which is a mechanism for obtaining a predetermined item by consuming a parameter or paying a predetermined sum in the game. Predetermined processing by which an item can be obtained may include processing for purchasing an item by consuming a game currency, processing for receiving a reward by clearing a predetermined challenge in the game, etc. It is to be noted that "predetermined processing in a game" does not include the above-described processing for acquiring an item by combining or exchanging items.

A "quest" has, for example, the meaning of a specific mission given to a player in a game, a challenge in a story different from a main story of the game, etc. When a "quest" is executed, a "parameter", which will be described later, is consumed. In a "quest", a character beats an enemy character through a battle, and an item is awarded to the player on the basis of an item acquisition probability set in association with at least either of the quest or the enemy character.

A "parameter" refers to information that is managed in association with a player in a game. For example, a "parameter" refers to information relating to the proceeding of a game, such as stamina indicating the physical strength or a game currency for the player in the game. The parameter is determined in accordance with the content of game play. The parameter is determined, for example, on the basis of the difficulty or importance of game play. The game currency may be acquired on the basis of payment for the game by the user, success in an event, an improvement in the level of the player, etc.

It is to be noted that, in the present invention, a "unit" does not simply refer to a physical means but also includes the case where the functionality of the "unit" is realized by software. Furthermore, the functionality of one "unit" or device may be realized by two or more physical means or devices, and the functionality of two or more "units" or devices may be realized by a single physical means or device.

Advantageous Effects of Invention

The present invention makes it possible to provide a game in which it is possible to readily recognize items that can be obtained.

BRIEF DESCRIPTION OF DRAWINGS

FIG. 4 shows an example of item management information according to the embodiment of the present invention.

FIG. 5 shows an example of quest management information according to the embodiment of the present invention.

FIG. 6 shows an example of player management information according to the embodiment of the present invention.

FIG. 11 shows an example screen of the output unit of the player terminal according to the embodiment of the present invention.

DESCRIPTION OF EMBODIMENTS

An embodiment of the present invention will be described below with reference to the accompanying drawings. The following embodiment is an example for explaining the present invention, and it is not intended to limit the present invention only to this embodiment. Furthermore, the present invention can be modified in various forms not departing from the gist thereof. Furthermore, the same reference signs are attached to the same components throughout the drawings wherever possible, and repeated descriptions will be omitted.

Figure 1:
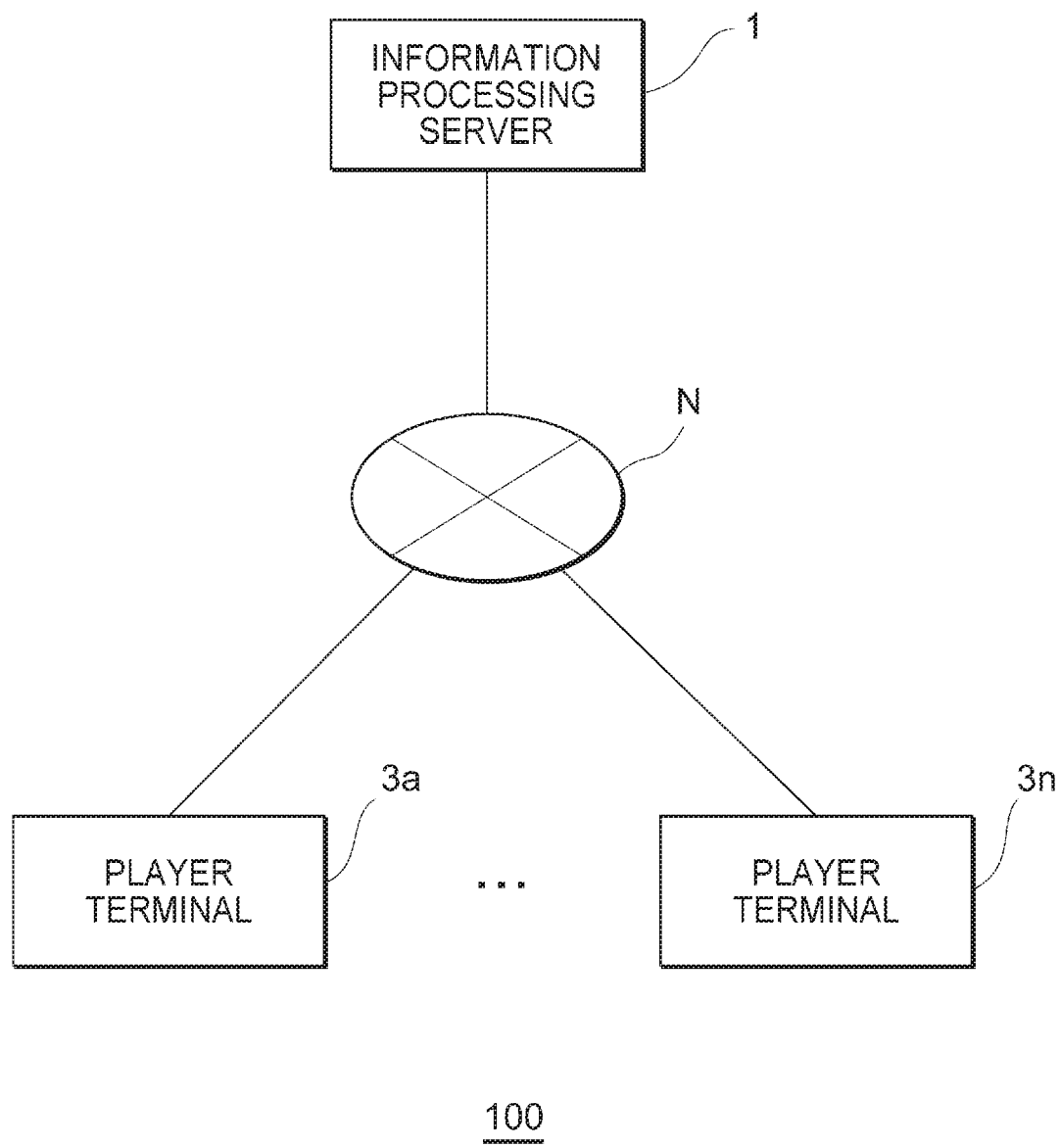
FIG. 1 is a schematic configuration diagram (system configuration diagram) of an information processing system according to an embodiment of the present invention.

FIG. 1 is a block diagram showing the overall configuration of an information processing system 100 according to this embodiment. As shown in FIG. 1, as an example, the information processing system 100 is configured to include an information processing server 1, n (n is an arbitrary integer greater than or equal to 1) player terminals 3, and a network N.

The information processing system 100 is what is called a client-server system. The information processing system 100 is realized by mutually carrying out communication between the n player terminals 3 acting as clients and the information processing server 1 via the network N.

The information processing server 1 is realized, for example, by a server device. Furthermore, the player terminals 3 are realized, for example, by smartphones, game machines, or personal computers. Furthermore, the network N is realized, for example, by the Internet, a network such as a mobile phone network, a LAN (Local Area Network), or a network formed by combining these types of networks.

In the drawings, a player terminal 3a and a player terminal 3n are shown as the n player terminals 3. In the following description, however, these n player terminals 3 will be simply referred to as the "player terminals 3", with the reference signs partially omitted, in the case where no distinction is made thereamong.

Figure 2:
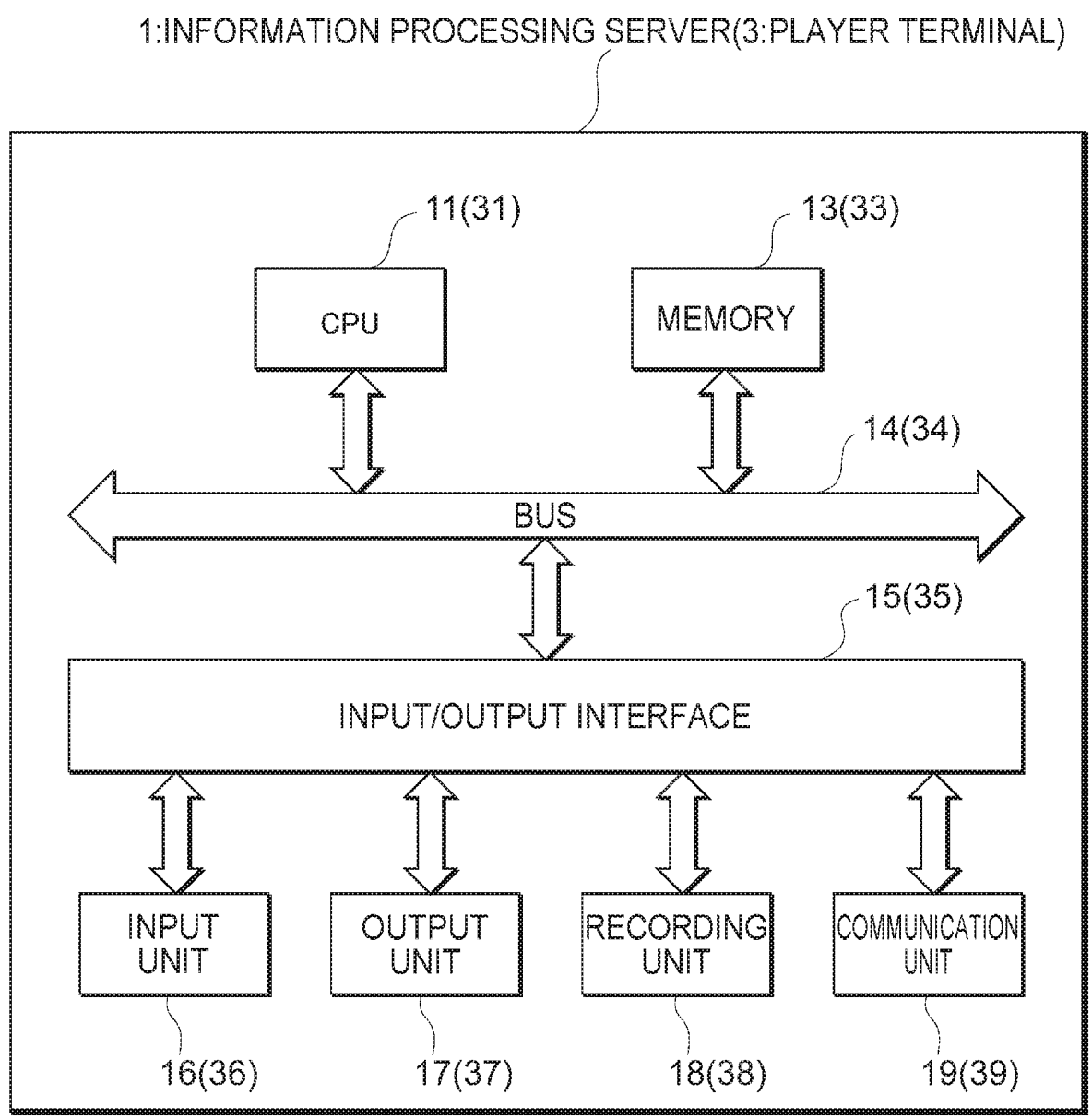
FIG. 2 is a schematic configuration diagram (block diagram) of an information processing server and a player terminal according to the embodiment of the present invention.

FIG. 2 is a block diagram showing the hardware configuration of the information processing server 1 and the hardware configuration of the player terminal 3 according to the embodiment of the present invention. In the figure, reference signs corresponding to the hardware of the information processing server 1 are shown without adding parentheses, and reference signs corresponding to the hardware of the player terminal 3 are shown with added parentheses.

As an example, the information processing server 1 includes a CPU (Central Processing Unit) 11, a memory 13 constituted of a ROM (Read Only Memory) 12, a RAM (Random Access Memory), etc., a bus 14, an input/output interface 15, an input unit 16, an output unit 17, a recording unit 18, and a communication unit 19.

The CPU 11 executes various kinds of processing according to programs recorded in the memory 13 or programs loaded from the recording unit 18 into the memory 13.

The memory 13 stores, as appropriate, data, etc. needed for the execution of various kinds of processing by the CPU 11. The CPU 11 and the memory 13 are connected to each other via the bus 14. The input/output interface 15 is also connected to the bus 14. The input unit 16, the output unit 17, the recording unit 18, and the communication unit 19 are connected to the input/output interface 15.

The input unit 16 is formed of various kinds of buttons, a touchscreen, a microphone, or the like, and accepts input of various kinds of information in accordance with instruction operations performed by the administrator of the information processing server 1 or the like. Alternatively, the input unit 16 may be realized by an input device, such as a keyboard or a mouse, that is independent of a main unit accommodating the other units of the information processing server 1.

The output unit 17 is formed of a display, a speaker, or the like, and outputs image data or music data. The image data or music data output from the output unit 17 is output from the display, the speaker, or the like in a form recognizable by a player, as an image or music.

The recording unit 18 is formed of a semiconductor memory, such as a DRAM (Dynamic Random Access Memory), and stores various kinds of data.

The communication unit 19 realizes communication that is carried out with other devices. For example, the communication unit 19 carries out communication mutually with the player terminals 3 via the network N.

Furthermore, although not shown, a drive is provided, as needed and as appropriate, in the information processing server 1. For example, a removable medium formed of a magnetic disk, an optical disk, a magneto-optical disk, a semiconductor memory, or the like is loaded, as appropriate, in the drive. The removable medium stores a program for executing a game and various kinds of data, such as image data. The program and the various kinds of data, such as image data, read by the drive from the removable medium, are installed in the recording unit 18, as needed.

Next, the hardware configuration of the player terminal 3 will be described. As shown in FIG. 2, as an example, the player terminal 3 includes a CPU 31, a memory 33, a bus 34, an input/output interface 35, an input unit 36, an output unit 37, a recording unit 38, and a communication unit 39. These units individually have functions equivalent to those of the units having the same names and different reference signs in the information processing server 1 described above. Thus, repeated descriptions will be omitted.

Figure 3:
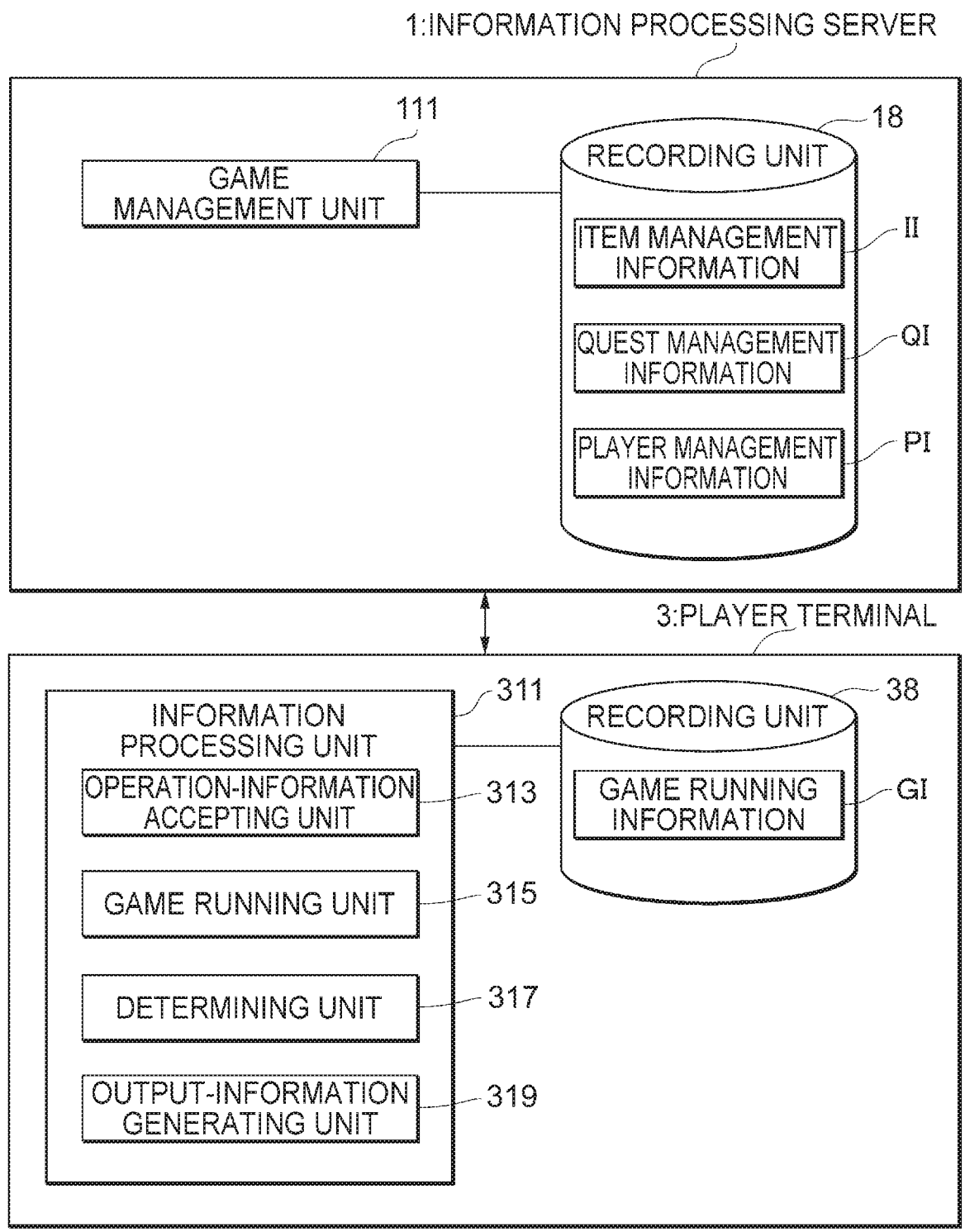
FIG. 3 is a schematic configuration diagram (block diagram) showing an example of the functional configurations of the information processing server and the player terminal according to the embodiment of the present invention.

FIG. 3 is a block diagram showing an example of the functional configuration of the information processing server 1 and the functional configuration of the player terminal 3 according to the embodiment of the present invention.

As an example, the information processing server 1 is configured to include a game management unit 111 that manages the proceeding of a game and a recording unit 18 that records information needed for the proceeding of the game. The game management unit 111 can be realized, for example, by the CPU 11 executing a program stored in the memory 13 or the recording unit 18 shown in FIG. 2.

The game management unit 111 manages information needed for the proceeding of a game that is run by a game running unit 315 of the player terminal 3, for example, item management information II, quest management information QI, player management information PI, and other parameters. For example, the game management unit 111 provides the player terminal 3 with information needed for the proceeding of the game when the game is played at the player terminal 3, and obtains, from the player terminal 3, information updated on the basis of the progress of the game executed at the player terminal 3 and manages the information.

The recording unit 18 records item management information II indicating various kinds of items in the game, quest management information QI indicating various kinds of quests in the game, and player management information PI indicating player information. The recording unit 18 may record various kinds of information in association with each other.

FIG. 4 shows an example of item management information according to the embodiment of the present invention. As shown in FIG. 4, as an example, the item management information II includes item IDs, item names, capabilities indicating capability values, such as offensive powers, defensive powers, and HP scores, and items used for combining. Here, item A can be obtained by combining items D. The item management information may further include available quest (processing) information indicating a quest (processing) by which an item can be obtained. Furthermore, the item management information may be predefined fixed values rather than information that changes as time passes on the basis of the proceeding of the game.

FIG. 5 shows an example of quest management information according to the embodiment of the present invention. As shown in FIG. 5, as an example, the quest management information QI includes quest IDs, quest names, the amounts of stamina consumed when executing the quests, and items that can be obtained when the quests are cleared. As such, items that can be obtained are managed in association with individual quests in the quest management information QI. Furthermore, the quest management information may be predefined fixed values rather than information that changes as time passes on the basis of the proceeding of the game.

FIG. 6 shows an example of player management information according to the embodiment of the present invention. As shown in FIG. 6, as an example, the player management information PI includes player IDs, player names, characters, quests that are open, possessed items, the amounts of stamina owned by the players, and game currencies owned by the players. Here, the quests that are open refer to quests that can be executed (challenged). For example, the condition for quest 4-6 to be managed as a quest that can be challenged may be the condition that quest 4-5, which is the quest immediately preceding quest 4-6, has been cleared. Alternatively, the condition for quest 4-6 to be managed as a quest that can be challenged may be the condition that quest 4-5 and all the quests preceding quest 4-5 (all of quest 1-1 to quest 4-4) have been cleared. Alternatively, it may be allowed to set an arbitrary quest as a quest that can be challenged according to a player instruction or the like. Furthermore, possessed items may be managed on a per-player basis or a per-character basis. The game currencies may include, for example, parameters that are consumed when acquiring equipment items by combining material items or parameters that are consumed when purchasing various kinds of items in the game. Furthermore, the player management information may be information that changes as time passes on the basis of the proceeding of the game and that are parameters associated with individual players.

Referring back to FIG. 3, as an example, the player terminal 3 is configured to include an information processing unit 311 that manages the execution of the game and that generates output information and a recording unit 38 that records information needed for the execution of the game.

The information processing unit 311 is functionally configured to include, for example, an operation-information accepting unit 313, a game running unit 315, a determining unit 317, and an output-information generating unit 319. These units of the information processing unit 311 can be realized by the CPU 31 executing programs stored in the memory 33 or the recording unit 38 shown in FIG. 2.

The operation-information accepting unit 313 accepts operations concerning the game from a player. The operation-information accepting unit 313 accepts operations concerning the game, performed by the player via the input unit 36. Then, the operation-information accepting unit 313 outputs the contents of the accepted operations to the game running unit 315.

The game running unit 315 executes processing for running the game. The game running unit 315 runs the game on the basis of game software included in game running information GI stored in the recording unit 38 and the contents of player operations input from the input unit 36 shown in FIG. 2.

As the game is run, the game running unit 315 executes control processing for generating game images from image data included in the game running information GI and outputting the generated images to the output unit 37. Similarly, as the game is run, the game running unit 315 executes control processing for generating game music and audio from music data and audio data included in the game running information GI and outputting the generated music and audio from the output unit 37.

As described earlier, various kinds of information in the game run by the game running unit 315, for example, the item management information II, the quest management information QI indicating various kinds of quests in the game, the player management information indicating player information, and parameters such as stamina and game currencies in the game, are managed by the information processing server 1. Thus, in the case where processing involving changes in these various kinds of information (e.g., processing involving changes in the contents of items, quests, parameters, or the like) occurs in the game, the game running unit 315 carries out communication with the information processing server 1 to update the parameters managed by the information processing server 1. Then, the game running unit 315 receives the updated parameters from the information processing server 1 and continues to run the game in accordance with the updated parameters.

The determining unit 317 determines whether or not the player possesses an equipment item (first item). Furthermore, the determining unit 317 determines whether the player can play (execute) a quest (predetermined processing in the game) with the equipment item (first item) or material items (second item) can be obtained.

On the basis of the result of determination by the determining unit 317, in a display screen for displaying information about the equipment item (first item) not possessed by the player, the output-information generating unit 319 generates output information for reporting that the equipment item can be obtained.

<Output-Information Generation Processing>

Figure 7:
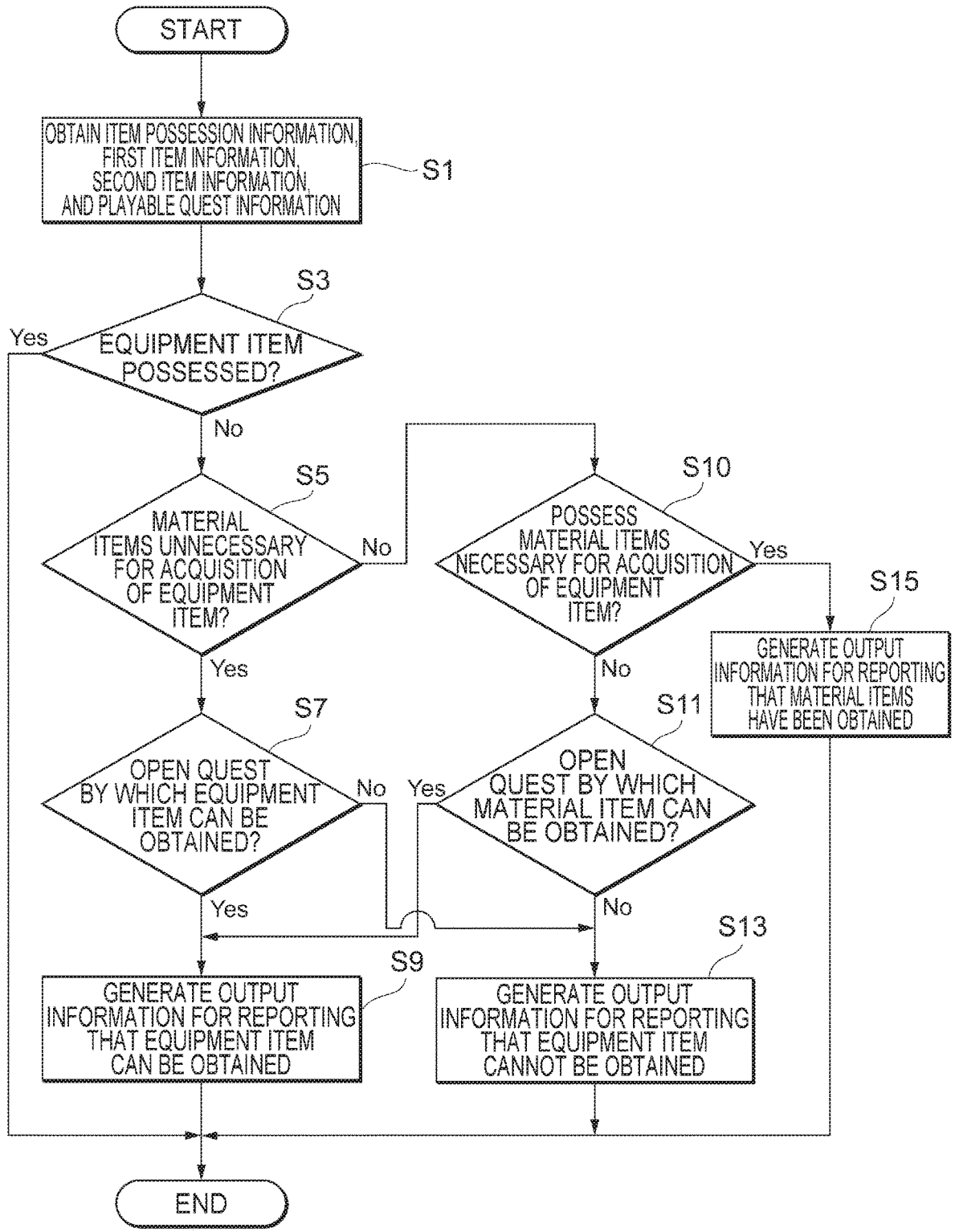
FIG. 7 is a flowchart showing an example of an output-information generating process according to the embodiment of the present invention.

Output-information generation processing for generating output information for reporting that an item can be obtained will be described with reference to FIG. 7. FIG. 7 is a flowchart showing an example of the output-information generation processing according to the embodiment of the present invention.

(Step S1)

The communication unit 39 (obtaining unit) of the player terminal 3 shown in FIG. 2 obtains various kinds of information based on the item management information II, the quest management information QI, and the player management information PI recorded in the recording unit 18 by the information processing server 1 shown in FIG. 3. For example, the communication unit 39, on the basis of the player management information PI, obtains item possession information indicating whether or not the player possesses at least one of an equipment item (first item) and a material item (second item) that can be obtained by executing predetermined processing in the game. The communication unit 39, on the basis of the quest management information QI, obtains first item information indicating an equipment item (first item) that is managed in association with a quest (processing) as well as second item information indicating a material item (second item) that is consumed in order to acquire the equipment item and that is managed in association with the quest. Furthermore, although not shown in FIG. 4, in the case where the item management information II further includes available quest (processing) information indicating a quest (processing) by which an item can be obtained, the communication unit 39 may obtain the first item information and the second item information on the basis of the item management information II. The communication unit 39, on the basis of the player management information PI, obtains playable quest information (executable processing information) indicating a quest (processing) that can be played (executed) by the player.

The communication unit 39 may obtain the item possession information, the first item information, the second item information, and the playable quest information at the same timing, or may obtain at least one of these kinds of information at a timing different from the timing for the other kinds of information. Furthermore, the timing for obtaining the various kinds of information may include the timing at which the game is activated, the timing at which each quest is activated in the game, the timing at which a certain screen is displayed on the output unit 37 of the player terminal 3 shown in FIG. 2, etc.

(Step S3)

The determining unit 317 of the player terminal 3 shown in FIG. 3 determines whether or not the player possesses the equipment item (first item) on the basis of the item possession information obtained by the communication unit 39 shown in FIG. 2. The process is terminated in the case where the determining unit 317 determines that the player possesses the equipment item (case of Yes). Meanwhile, the process proceeds to step S5 in the case where the determining unit 317 determines that the player does not possess the equipment item (case of No).

(Step S5)

The determining unit 317 determines whether or not a material item is necessary in order to acquire the equipment item on the basis of the first item information obtained by the communication unit 39 shown in FIG. 2. For example, the process proceeds to step S7 in the case where the determining unit 317 determines that the first item information does not include information about material items that are combined in order to acquire the equipment item (case of Yes). Meanwhile, the process proceeds to step S10 in the case where the first item information includes information about material items that are combined in order to acquire the equipment item (case of No). Step S10 will be described later in detail.

(Step S7)

The determining unit 317 determines whether or not the player can execute processing by which the equipment item (first item) can be obtained. For example, the process proceeds to step S9 in the case where the determining unit 317 determines that a quest by which the equipment item can be obtained is open on the basis of the first item information and the playable quest information (executable processing information) obtained by the communication unit 39 shown in FIG. 2 (case of Yes).

Specifically, with reference to FIGS. 4 to 6, for example, in the case where item C shown in FIG. 4 is an equipment item of player A, the determining unit 317 determines that item C is not an item that is created by combining material items but is an item that can be obtained by clearing a quest or the like. Then, the determining unit 317 can determine that item C can be obtained by clearing quest 3-3, as shown in FIG. 5, and that quest 3-3 is open to player A, as shown in FIG. 6. Note that although item C can also be obtained by clearing quest 6-2, as shown in FIG. 5, since only quests preceding and including 6-1 are open to player A, and thus quest 6-2 is not open, as shown in FIG. 6, the player cannot execute quest 6-2.

Furthermore, in the case where it is possible to obtain a certain item and there are a plurality of open quests therefor, the determining unit 317 terminates search processing when at least one quest is successfully identified.

With this configuration, since it is not necessary to check all the quest information in the search processing, it is possible to alleviate the load associated with the search processing.

(Step S9)

The output-information generating unit 319 shown in FIG. 3 generates output information for reporting that the equipment item can be obtained. Then, the output information generated by the output-information generating unit 319 is output on a display screen displaying information concerning the equipment item not possessed by the player, which is output by the output unit 37 of the player terminal 3 shown in FIG. 2.

Figure 8:
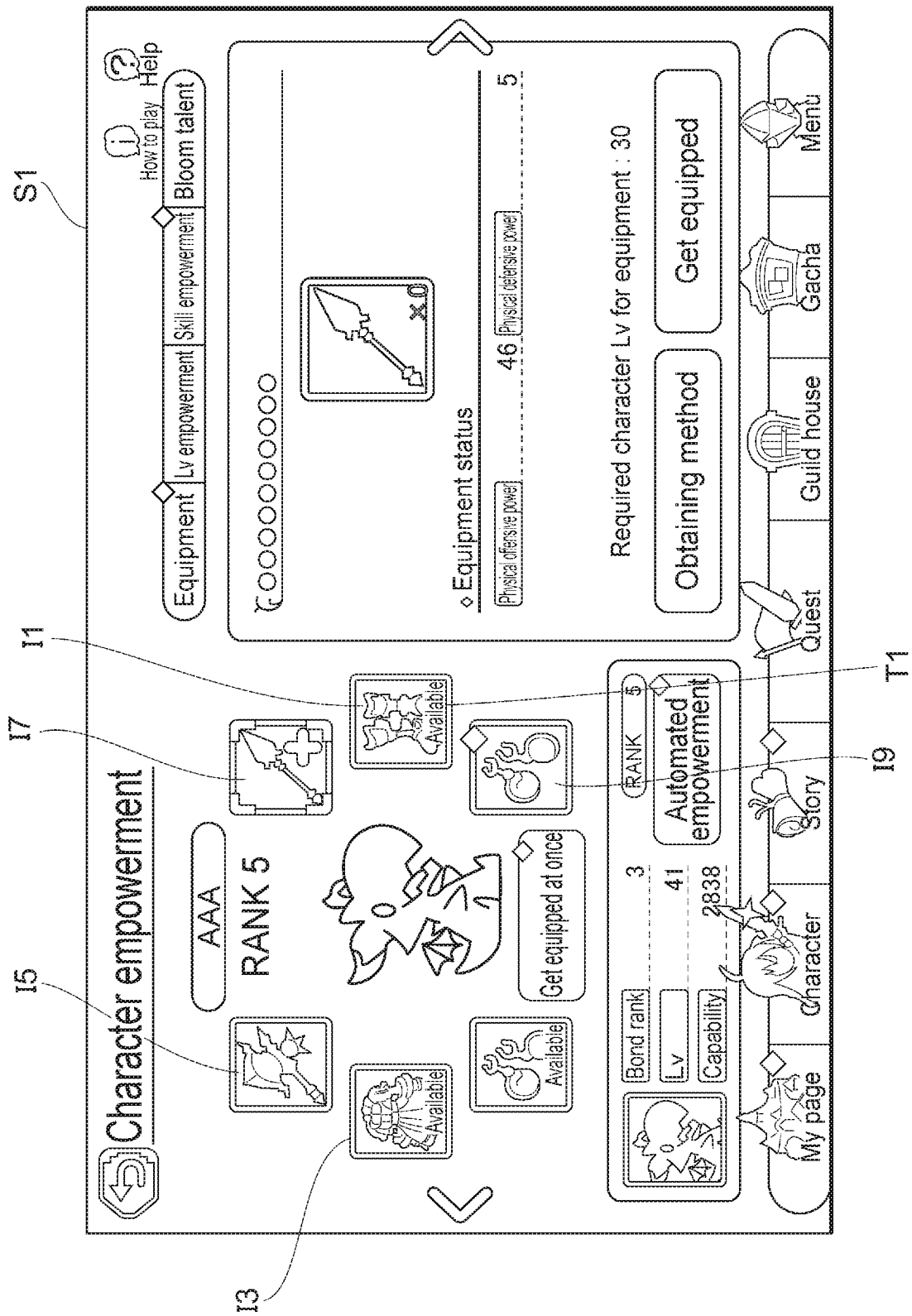
FIG. 8 shows an example screen of an output unit of the player terminal according to the embodiment of the present invention.

FIG. 8 shows an example of a player empowerment screen for empowering the level or capability of the player so as to empower possessed items or equipment items of the player, which is output by the output unit of the player terminal according to the embodiment of the present invention. As shown in FIG. 8, the output-information generating unit 319 generates an image I1 (output information) for reporting that an equipment item can be obtained in a player empowerment screen S1 (display screen). Here, for example, as shown in FIG. 8, the image I1 includes an image in which text T1 saying "available" is superimposed on an image indicating a shoe item. The image I1 is not limited to this example and may be generated such that, on an image indicating a shoe item, another image indicating that the equipment item can be obtained is superimposed. Furthermore, in order to report that an equipment item can be obtained, the output-information generating unit 319 may generate the player empowerment screen S1 such that an image indicating a shoe item is displayed in a mode different from a display mode of images indicating other items.

Meanwhile, the process proceeds to step S13 in the case where the determining unit 317 determines in step S7 that no quest by which the equipment item can be obtained is open on the basis of the first item information and the playable quest information (case of No). Step S13 will be described later in detail.

(Step S10)

The determining unit 317 determines whether or not the player possesses material items (second items) necessary for acquiring the equipment item (first item). Specifically, the process proceeds to step S11 in the case where the determining unit 317 determines that the player does not possess material items necessary to acquire the equipment item on the basis of the item possession information, the first item information, and the second item information obtained by the communication unit 39 shown in FIG. 2 (case of No). For example, as shown in FIG. 4, in the case where item B is an equipment item, item N, item S, and item Z, which are material items, are necessary in order to acquire item B. In the case where there is at least one material item that is not possessed by the player among these three material items, the determining unit 317 determines that the player does not possess material items necessary for acquiring the equipment item.

Meanwhile, the process proceeds to step S15 in the case where the determining unit 317 determines that the player possesses material items necessary for acquiring the equipment items on the basis of the item possession information, the first item information, and the second item information obtained by the communication unit 39 shown in FIG. 2 (case of Yes). Step S15 will be described later in detail.

(Step S11)

The determining unit 317 determines whether or not the player can execute processing by which the material items (second items) can be obtained. For example, the process proceeds to step S9 in the case where the determining unit 317 determines that a quest by which the material items can be obtained is open on the basis of the second item information and the playable quest information (executable processing information) obtained by the communication unit 39 shown in FIG. 2 (case of Yes).

For example, in the case where item A shown in FIG. 4 is an equipment item, the determining unit 317 determines that item A is an item that is created by combining material items D. Note that an equipment item may be an item that can be obtained directly by clearing one or more quests. In this case, the determining unit 317 may determine whether or not the player can play a quest by which an equipment item (first item) or material items (second items) can be obtained on the basis of the result of searching for at least either the equipment item or the material items that can be obtained in each quest (executable processing) that the player can play.

The item searching processing will be described below in detail. The determining unit 317 may execute item searching after identifying a playable quest. For example, the determining unit 317 may identify a quest that can be played by the player on the basis of the playable quest information (executable processing information), may search for at least either an equipment item (first item) or material items (second items) that can be obtained in the identified quest on the basis of at least either the first item information and the second item information, and may determine on the basis of the result of searching whether or not the player can execute processing by which the equipment item or the material items can be obtained.

Alternatively, the determining unit 317 may execute quest (processing) searching after determining the availability of items. For example, the determining unit 317 may determine whether or not at least either an equipment item (first item) or material items (second items) can be obtained on the basis of at least either the first item information or the second item information, may search for a quest by which the items can be obtained on the basis of the playable quest information in the case where the items can be obtained, and may determine whether or not the player can execute processing by which the equipment item or the material items can be obtained.

Figure 9:
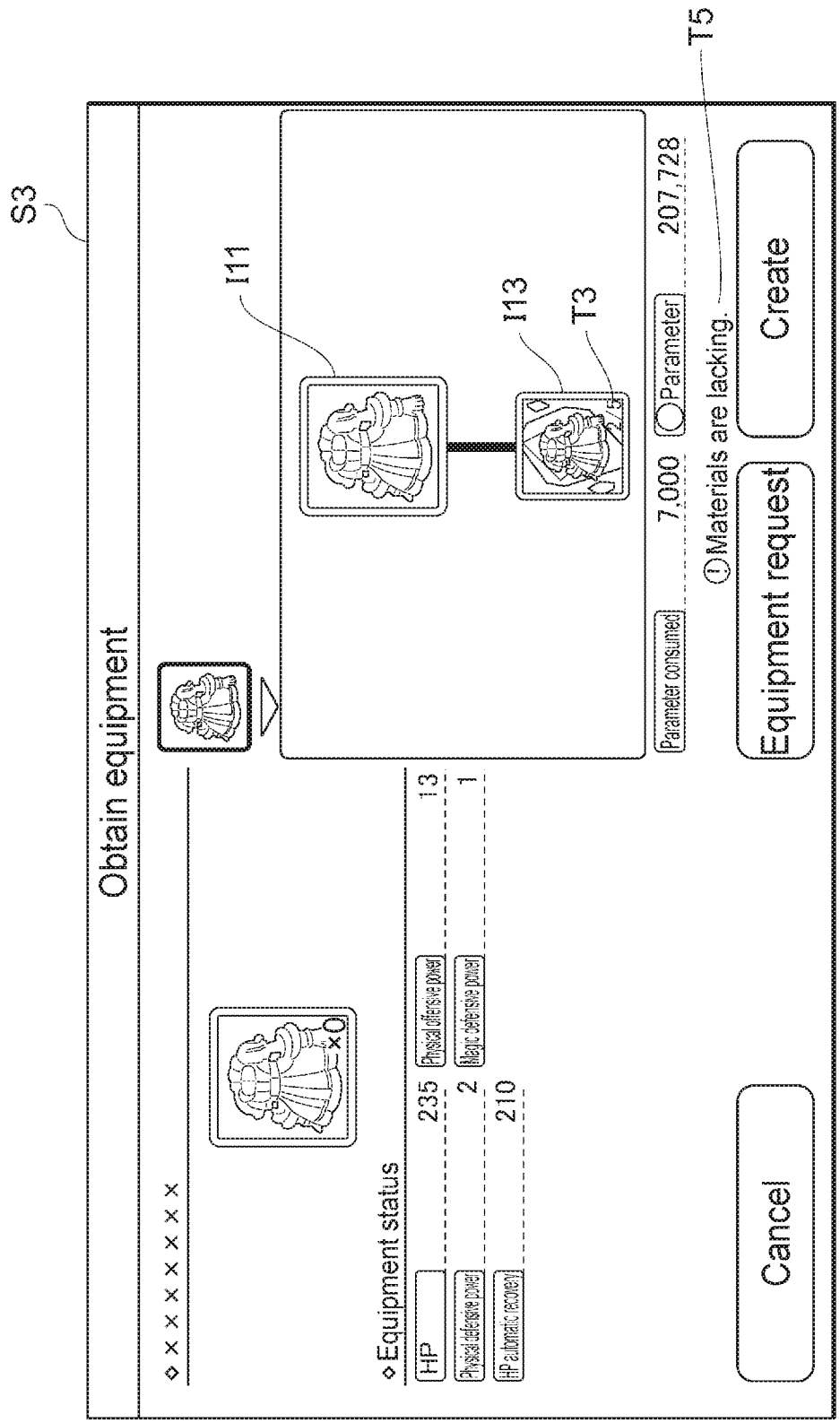
FIG. 9 shows an example screen of the output unit of the player terminal according to the embodiment of the present invention.

FIG. 9 shows an example of an item creating screen output by the output unit of the player terminal according to the embodiment of the present invention. For example, as shown in FIG. 9, when the determining unit 317 determines that item A, which is a clothing item, is an item that is created by combining material items D, the output-information generating unit 319 shown in FIG. 3 generates an item creating screen S3 including an image I11 indicating equipment item A and an image T13 indicating material items D. Text T3 saying "⅖" indicates that equipment item A is created by combining five material items D and that two material items D are currently possessed.

Currently, the number of material items D is not enough to create equipment item A. Thus, in this case, the output-information generating unit 319 may generate an item creating screen S3 such that information indicating that material items are lacking, such as text T5 saying "! Materials are lacking", is included.

With this configuration, the player can readily recognize that material items necessary for creating an equipment item are not ready.

Next, the determining unit 317 can determine that items D can be obtained by clearing quest 5-7 or quest 6-2, as shown in FIG. 5, and that quest 5-7 is open and quest 6-2 is not open to player A, as shown in FIG. 6. Thus, since at least one quest, i.e., quest 5-7, is open, the determining unit 317 determines that a quest by which the material items can be obtained is open, and the process proceeds to step S9. For example, as shown in FIG. 8, the output-information generating unit 319 generates an image I3 (output information) for reporting that the equipment item can be obtained in the player empowerment screen S1 (display screen). Here, for example, as shown in FIG. 8, the image I3 includes an image in which text saying "available" is superimposed on an image indicating a clothing item.

Figure 10:
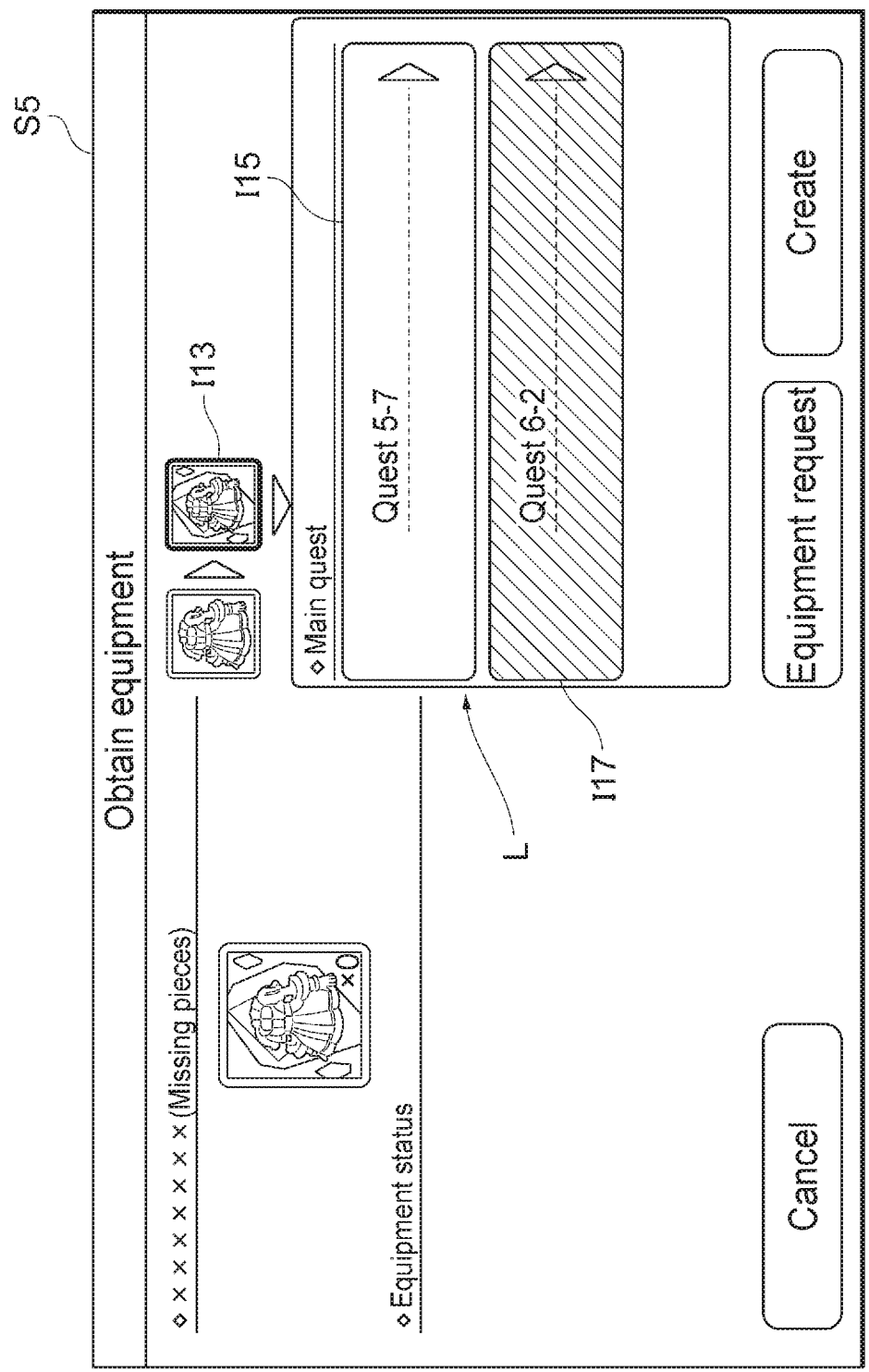
FIG. 10 shows an example screen of the output unit of the player terminal according to the embodiment of the present invention.

FIG. 10 shows an example of a quest selecting screen output by the output unit of the player terminal according to the embodiment of the present invention. As shown in FIG. 10, the output-information generating unit 319 shown in FIG. 3 refers to the quest management information QI on the basis of a player instruction to generate output information for outputting a quest selecting screen S5 (selecting screen) including a list L of quests by which material items D indicated by the image I13 can be obtained.

Here, as described earlier, quests by which material items D can be obtained are quest 5-7 and quest 6-2, of which quest 5-7 is open and quest 6-2 is not open. Thus, as the list L, the output-information generating unit 319 generates output information for outputting a quest selecting screen S5 including an image I15 indicating the open quest 5-7 and an image I17 indicating the non-open quest 6-2. Furthermore, in order to indicate that quest 6-2 is not open, the image I17 is displayed in a mode different from the mode of the image I15 in the quest selecting screen S5. For example, the output information may be generated such that the image I17 is grayed out. Then, when the player selects quest 5-7 in the quest selecting screen, the quest is started by the game running unit 315 (processing execution unit) of the player terminal 3 shown in FIG. 3.

With this configuration, it is possible to readily recognize whether or not a quest by which a predetermined item can be obtained is open in the quest selecting screen.

In the above example, the quests by which material items D can be obtained are the two quests 5-7 and 6-2, and thus these two quests are displayed in the quest selecting screen. In the case where there is only one quest by which material items D can be obtained, the single quest is displayed in the quest selecting screen. In the case where there are three or more quests by which material items D can be obtained, the three or more quests are displayed in the screen S5. As "predetermined processing in the game", by which the player can obtain material items D, without limitation to the quests described above, gacha or purchasing of items may be included. That is, a gacha executing screen or an item purchasing screen may be displayed instead of the quest selecting screen S5.

Meanwhile, the process proceeds to step S13 in the case where the determining unit 317 determines that the quest by which material items can be obtained is not open on the basis of the second item information and the playable quest information (case of No).

(Step S13)

The output-information generating unit 319 shown in FIG. 3 generates output information for reporting that the equipment item cannot be obtained. As shown in FIG. 8, the output-information generating unit 319 generates an image I5 (output information) for reporting that the equipment item cannot be obtained in the player empowerment screen S1 (display screen). Here, for example, as shown in FIG. 8, the image I5 is an image indicating an axe item, and as opposed to the other images I1 and I3, text or the like is not superimposed on that image. Without limitation to this example, for example, the image for reporting that the equipment item cannot be obtained may include an image in which text saying "unavailable" is superimposed on an image indicating an axe item.

(Step S15)

The output-information generating unit 319 shown in FIG. 3 generates output information for reporting that material items have been obtained. For example, with reference to the above-described example shown in FIG. 9, in the case where five items D necessary for acquiring equipment item A have been obtained, for example, text information saying "5/5" is output instead of the text T3, "⅖", shown in FIG. 9. Alternatively, the output-information generating unit 319 may generate an item creating screen such that text information saying "Necessary materials are ready" is included instead of information for reporting that material items are lacking, such as the text T5, "! Materials are lacking", shown in FIG. 9.

With this configuration, the player can readily recognize that material items necessary for creating an equipment item are ready.

In the case where the determining unit 317 determines in step S3 that the player possesses the equipment item, as shown in FIG. 8, the output-information generating unit 319 shown in FIG. 3 may generate an image I7 indicating that the player possesses (but is not equipped with) the equipment item. The image I7 includes an image in which an image or text indicating "+" is superimposed on an image indicating a spear item. Here, examples in which the player possesses but is not equipped with an item that the player can be equipped with include the case where the player has not simply performed an operation for getting equipped with the item and the case where the player does not have a player level or parameters needed for getting equipped with the item.

With this configuration, the player can readily recognize that the player possesses but is not equipped with the equipment item in the player empowerment screen S1.

Furthermore, in the case where the determining unit 317 determines that the player possesses and is equipped with the equipment item, the output-information generating unit 319 may generate an image I9 indicating that the player is equipped with the equipment item.

With this configuration, the player can readily recognize that the player is equipped with the equipment item in the player empowerment screen S1.

With the above-described embodiment of the present invention, in the case where it is determined that a player does not possess an equipment item and that the player can execute processing by which the equipment item can be obtained, output information for reporting that the equipment item can be obtained is generated in the player empowerment screen S1 displaying information concerning the equipment item not possessed by the player. Thus, it is possible to provide a game in which it is possible to readily recognize available items.

It is to be noted that the above-described embodiments are presented to facilitate the understanding of the present invention and should not be construed to limit the present invention. The present invention can be modified or improved without departing from the gist thereof, and the present invention encompasses equivalents thereof.

FIG. 11 shows another example of an item creating screen output by the output unit of the player terminal according to the embodiment of the present invention. As shown in FIG. 11, an item creating screen S7 is an example in which an equipment item is created by combining two material items of different kinds. An image I21 indicates the equipment item, and images 123 and 125 indicate the individual material items. Here, the output-information generating unit 319 shown in FIG. 3 may generate output information for reporting that the material items can be obtained in the item creating screen as well as output information for reporting that the equipment item can be obtained. Specifically, an image I25 includes an image in which text T1 saying "available" is superimposed on an image indicating an axe item, which is a material item.

With this configuration, the player can readily recognize whether or not material items can be obtained in the item creating screen.

Furthermore, in the case where an equipment item is an item that can be obtained directly by clearing a quest and that is created by combining one or more material items, processing in both steps S7 and S11 shown in FIG. 7 may be executed.

As described above, the player terminal 3 shown in FIG. 3 includes the game running unit 315, the determining unit 317, and the output-information generating unit 319. This is because, if the information processing server 1 includes the game running unit 315, the determining unit 317, and the output-information generating unit 319, most information processing is executed by the information processing server 1, which results in a considerable processing burden of the information processing server 1. Processing steps are distributed to the information processing server 1 and the player terminal 3 in order to alleviate this processing burden. Furthermore, if the information processing server 1 includes the game running unit 315, the determining unit 317, and the output-information generating unit 319, it is necessary to frequently send game data to the player terminal 3, which results in a huge amount of communication between the information processing server 1 and the player terminal 3. The player terminal is configured to include the game running unit 315, the determining unit 317, and the output-information generating unit 319 in order to reduce this amount of communication.

Here, by concentrating functions to the player terminal 3, there is an increased possibility that the player will conduct acts of cheating at the player terminal 3, such as tampering with various kinds of items, various kinds of parameters, etc. However, since the latest updated information is managed at the information processing server 1, it is possible to check whether or not acts of cheating have been conducted by occasionally performing comparison with the information managed at the information processing server 1, which makes it possible to prevent acts of cheating.

REFERENCE SIGNS LIST

1 Information processing server
3 Player terminal
11 (31) CPU
13 (33) Memory
14 (34) Bus
15 (35) Input/output interface
16 (36) Input unit
17 (37) Output unit
18 (38) Recording unit
19 (39) Communication unit
111 Game management unit
311 Information processing unit
313 Operation-information accepting unit
315 Game running unit
317 Determining unit
319 Output-information generating unit

The invention claimed is:

1. A non-transitory computer readable medium storing instructions executable by a computer, the instructions when executed by the computer, cause the computer to perform a method comprising:
   obtaining item possession information indicating whether a player possesses an equipment item based on executing predetermined processing in a game, item information indicating the equipment item managed in association with the predetermined processing, and playable quest information indicating a plurality of quests that can be executed by the player;
   determining, based on the item possession information, whether the player possesses the equipment item;
   determining, based on the item information and the playable quest information, whether the player can execute processing to obtain the equipment item;
   searching, based on the playable quest information and the item information, for a predetermined quest among a plurality of quests that can be performed by quest processing, and
   determining, based on a result of searching for the predetermined quest, whether the player can execute the quest processing by which the equipment item can be obtained; and generating, in response to determining that the player does not possess the equipment item and determining that the player can execute processing to obtain the equipment item, a display screen that is output on a display of a terminal, wherein the display screen comprises an image indicating an availability of the equipment item in response to the player performing the predetermined quest, and wherein generating the display screen comprises outputting a quest selecting screen by which the equipment item can be obtained.

2. A non-transitory computer readable medium storing instructions executable by a computer, the instructions when executed by the computer, cause the computer to perform a method comprising:

obtaining item possession information indicating whether a player possesses an equipment item and a material item based on executing predetermined processing in a game, first item information indicating the equipment item managed in association with the predetermined processing, second item information indicating the material item consumed for a purpose of acquiring the equipment item and managed in association with the predetermined processing, and playable quest information indicating a plurality of quests that can be executed by the player;

determining, based on the item possession information, whether the player possesses the equipment item;

determining, based on the second item information and the playable quest information, whether the player can execute processing to obtain the material item;

searching, based on the playable quest information and the second item information, for a predetermined quest among a plurality of quests that can be performed by quest processing;

determining, based on a result of searching for the predetermined quest, whether the player can execute the quest processing by which the equipment item can be obtained; and generating, in response to determining that the player does not possess the equipment item and determining that the player can execute processing to obtain the material item, a display screen that is output on a display of a terminal, wherein the display screen comprises an image indicating an availability of the equipment item in response to the player performing the predetermined quest, and wherein generating the display screen comprises outputting a quest selecting screen by which the equipment item can be obtained.

3. The non-transitory computer readable medium according to claim 2, further comprising instructions when executed by the computer, cause the computer to perform the method comprising determining, based on at least either of the first item information and the second item information, whether at least either of the equipment item and the material item can be obtained, and in response to determining that the equipment item can be obtained, that searches, based on the playable quest information, processing by which the equipment item can be obtained, and that determines, based on a result of searching, whether the player can execute processing by which the equipment item or the material item can be obtained.

4. The non-transitory computer readable medium according to claim 2, wherein the display screen comprises another image or text indicating that the equipment item can be obtained is superimposed on an image indicating the equipment item.

5. The non-transitory computer readable medium according to claim 2, wherein the display screen is generated with a display mode of the image indicating the equipment item differs from a display mode of images indicating other items.

6. An information processing server comprising:

a computer processor; and a memory connected to the computer processor, wherein the memory comprises instructions executable by the computer processor and configured to:

record item possession information indicating whether a player possesses an equipment item based on executing predetermined processing in a game, item information indicating the equipment item managed in association with the predetermined processing, and playable quest information indicating a plurality of quests that can be executed by the player;

determine, based on item possession information, whether the player possesses the equipment item;

determine, based on the item information and the playable quest information, whether the player can execute processing to obtain the equipment item;

search, based on the playable quest information and the item information, for a predetermined quest among a plurality of quests that can be performed by quest processing, and determine, based on a result of searching for the predetermined quest, whether the player can execute the quest processing by which the equipment item can be obtained; and generate, in response to determining that the player does not possess the equipment item and determining that the player can execute processing to obtain the equipment item, a display screen that is output on a display of a terminal, wherein the display screen comprises an image indicating an availability of the equipment item in response to the player performing the predetermined quest, and wherein generating the display screen comprises outputting a quest selecting screen by which the equipment item can be obtained.

7. An information processing server comprising:

a computer processor; and a memory connected to the computer processor, wherein the memory comprises instructions executable by the computer processor and configured to:

record item possession information indicating whether a player possesses an equipment item and a material item based on executing predetermined processing in a game, first item information indicating the equipment item managed in association with the predetermined processing, second item information indicating the material item consumed for a purpose of acquiring the equipment item and managed in association with the predetermined processing, and playable quest information indicating a plurality of quests that can be executed by the player;

determine, based on item possession information, whether the player possesses the equipment item;

determine, based on the second item information and the playable quest information, whether the player can execute processing to obtain the material item;

search, based on the playable quest information and the second item information, for a predetermined quest among a plurality of quests that can be performed by quest processing;

determine, based on a result of searching for the predetermined quest, whether the player can execute the quest processing by which the equipment item can be obtained; and generate, in response to determining that the player does not possess the equipment item and determining that the player can execute processing to obtain the material item, a display screen that is output on a display of a terminal, wherein the display screen comprises an image indicating an availability of the equipment item in response to the player performing the predetermined quest, and wherein generating the display screen comprises outputting a quest selecting screen by which the equipment item can be obtained.

8. An information processing method comprising:

a step of recording item possession information indicating whether a player possesses an equipment item based on executing predetermined processing in a game;

a step of recording item information indicating the equipment item managed in association with the predetermined processing;

a step of recording playable quest information indicating a plurality of quests that can be executed by the player;

a step of determining, based on item possession information, whether the player possesses the equipment item;

a step of determining, based on the item information and the playable quest information, whether the player can execute processing to obtain the equipment item;

a step of searching, based on the playable quest information and the item information, for a predetermined quest among a plurality of quests that can be performed by quest processing, and a step of determining, based on a result of searching for the predetermined quest, whether the player can execute the quest processing by which the equipment item can be obtained; and a step of generating, in response to determining that the player does not possess the equipment item and determining that the player can execute processing to obtain the equipment item, a display screen that is output on a display of a terminal, wherein the display screen comprises an image indicating an availability of the equipment item in response to the player performing the predetermined quest, and wherein generating the display screen comprises outputting a quest selecting screen by which the equipment item can be obtained.

9. An information processing method comprising:

a step of recording item possession information indicating whether a player possesses an equipment item and a material item based on executing predetermined processing in a game;

a step of recording first item information indicating the equipment item managed in association with the predetermined processing;

a step of recording second item information indicating the material item consumed for a purpose of acquiring the equipment item and managed in association with the predetermined processing;

a step of recording playable quest information indicating a plurality of quests that can be executed by the player;

a step of determining, based on item possession information, whether the player possesses the equipment item;

a step of determining, based on the second item information and the playable quest information, whether the player can execute processing to obtain the material item;

a step of searching, based on the playable quest information and the second item information, for a predetermined quest among a plurality of quests that can be performed by quest processing;

a step of determining, based on a result of searching for the predetermined quest, whether the player can execute the quest processing by which the equipment item can be obtained; and a step of generating, in response to determining that the player does not possess the equipment item and determining that the player can execute processing to obtain the material item, a display screen that is output on a display of a terminal, wherein the display screen comprises an image indicating an availability of the equipment item in response to the player performing the predetermined quest, and wherein generating the display screen comprises outputting a quest selecting screen by which the equipment item can be obtained.

10. An information processing system comprising:

an information processing server; and a terminal communicatively connected to the information processing server, wherein the information processing server is configured to:

record item possession information indicating whether a player possesses an equipment item based on executing predetermined processing in a game, record item information indicating the equipment item managed in association with the predetermined processing, and record playable quest information indicating a plurality of quests that can be executed by the player; and send the item possession information, the item information, and the playable quest information, and wherein the terminal is configured to:

obtain the item possession information, the item information, and the playable quest information;

determine, based on item possession information, whether the player possesses the equipment item;

determine, based on the item information and the playable quest information, whether the player can execute processing to obtain the equipment item;

search, based on the playable quest information and the item information, for a predetermined quest among a plurality of quests that can be performed by quest processing, and determine, based on a result of searching for the predetermined quest, whether the player can execute the quest processing by which the equipment item can be obtained; and generate, in response to determining that the player does not possess the equipment item and determining that the player can execute processing to obtain the equipment item, a display screen that is output on a display of a terminal, wherein the display screen comprises an image indicating an availability of the equipment item in response to the player performing the predetermined quest, and wherein generating the display screen comprises outputting a quest selecting screen by which the equipment item can be obtained.

11. An information processing system comprising:

an information processing server; and a terminal communicatively connected to the information processing server, wherein the information processing server is configured to:
  record item possession information indicating whether a player possesses an equipment item and a material item based on executing predetermined processing in a game,
  record first item information indicating the equipment item managed in association with the predetermined processing,
  record second item information indicating the material item consumed for a purpose of acquiring the equipment item and managed in association with the predetermined processing, and
  record playable quest information indicating plurality of quests that can be executed by the player; and
  send the item possession information, the first item information, the second item information, and the playable quest information, and
wherein the terminal configured to:
  obtain the item possession information, the first item information, the second item information, and the playable quest information;
  determine, based on item possession information, whether the player possesses the equipment item;
  determine, based on the second item information and the playable quest information, whether the player can execute processing to obtain the material item;
  search, based on the playable quest information and the second item information, for a predetermined quest among a plurality of quests that can be performed by quest processing;
  determine, based on a result of searching for the predetermined quest, whether the player can execute the quest processing by which the equipment item can be obtained; and
  generate, in response to determining that the player does not possess the equipment item and determining that the player can execute processing to obtain the material item, a display screen that is output on a display of a terminal,
wherein the display screen comprises an image indicating an availability of the equipment item in response to the player performing the predetermined quest, and
wherein generating the display screen comprises outputting a quest selecting screen by which the equipment item can be obtained.

* * * * *